United States Patent
Ahn et al.

(10) Patent No.: US 10,406,440 B2
(45) Date of Patent: Sep. 10, 2019

(54) METHOD OF COLLECTING ADVERTISEMENT EXPOSURE DATA OF 360 VR GAME REPLAY VIDEO

(71) Applicant: MINKONET CORPORATION, Seoul (KR)

(72) Inventors: Sanghyuk Ahn, Seoul (KR); Tae Woo Kim, Gyeonggi-do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 192 days.

(21) Appl. No.: 15/247,921

(22) Filed: Aug. 26, 2016

(65) Prior Publication Data

US 2018/0056190 A1   Mar. 1, 2018

(51) Int. Cl.
| | |
|---|---|
| A63F 13/61 | (2014.01) |
| G06F 3/01 | (2006.01) |
| A63F 13/525 | (2014.01) |
| A63F 13/25 | (2014.01) |
| G06Q 30/02 | (2012.01) |

(52) U.S. Cl.
CPC .............. *A63F 13/61* (2014.09); *A63F 13/25* (2014.09); *A63F 13/525* (2014.09); *G06F 3/013* (2013.01); *G06Q 30/0272* (2013.01); *A63F 2300/8082* (2013.01)

(58) Field of Classification Search
CPC ......... A63F 13/61; A63F 13/25; A63F 13/525
USPC ....................................... 345/210, 633, 419
See application file for complete search history.

(56) References Cited

U.S. PATENT DOCUMENTS

| | | | |
|---|---|---|---|
| 8,542,232 B2* | 9/2013 | Hyndman | G06F 3/011 345/419 |
| 9,754,419 B2* | 9/2017 | Petrovskaya | G06T 19/006 |
| 2014/0192084 A1* | 7/2014 | Latta | G06F 21/10 345/633 |
| 2016/0026253 A1* | 1/2016 | Bradski | G02B 27/225 345/8 |
| 2016/0166146 A1* | 6/2016 | Sarkar | A61B 3/113 351/210 |
| 2017/0154468 A1* | 6/2017 | Xu | G06T 15/04 |
| 2018/0021684 A1* | 1/2018 | Benedetto | A63F 13/355 |
| 2018/0040161 A1* | 2/2018 | Tierney | G06T 19/006 |

FOREIGN PATENT DOCUMENTS

| | | |
|---|---|---|
| JP | H10216357 | 8/1998 |
| KR | 20000059204 | 10/2000 |
| KR | 20030066180 | 8/2003 |

(Continued)

*Primary Examiner* — David Duffy
*Assistant Examiner* — Ankit B Doshi
(74) *Attorney, Agent, or Firm* — JCIPRNET

(57) ABSTRACT

Provided is a method of collecting advertisement exposure data of a 360 virtual reality (VR) game replay video, in which data on advertisements that are applied to a game replay video and actually exposed to a user when the game replay video is displayed on a 360 VR display device is collected.

According to the method of collecting advertisement exposure data of a 360 VR game replay video, data on advertisements that are actually exposed to a user when the user views the 360 VR game replay video by using the 360 VR display device, from among advertisements applied to the 360 VR game replay video, may be effectively collected.

10 Claims, 4 Drawing Sheets

(56) References Cited

FOREIGN PATENT DOCUMENTS

| KR | 20060129983 | 12/2006 |
|----|-------------|---------|
| KR | 100787606   | 12/2007 |
| KR | 20080035287 | 4/2008  |
| KR | 100932675   | 12/2009 |
| KR | 20100137792 | 12/2010 |
| KR | 20110081400 | 7/2011  |
| KR | 20110130315 | 12/2011 |
| KR | 20130025200 | 3/2013  |
| KR | 20130098741 | 9/2013  |
| KR | 101353531   | 1/2014  |
| KR | 101604250   | 3/2016  |
| KR | 101643102   | 8/2016  |
| KR | 101644496   | 8/2016  |
| KR | 20160096019 | 8/2016  |

* cited by examiner

METHOD OF COLLECTING ADVERTISEMENT EXPOSURE DATA OF 360 VR GAME REPLAY VIDEO

TECHNICAL FIELD

The present disclosure relates to a method of collecting advertisement exposure data of a 360 VR (virtual reality) game replay video, and more particularly, to a method of collecting advertisement exposure data of a 360 VR game replay video, in which data on advertisements applied to a game replay video and actually exposed to a user when the game replay video is displayed on a 360 VR display device is collected.

BACKGROUND ART

With the increase in the number of game users, more users view game play videos via the Internet or broadcasting.

Game play videos may be replayed and viewed in various manners. A game player may record his or her game play situation and view the recorded video on his or her terminal, or may upload the recorded game video to a server such as YouTube for others to view. In addition, a game play situation may be relayed in real time via cable broadcasting or Internet broadcasting.

Recently, such game replay videos are frequently provided in a 360-degree virtual reality (VR) video format. In addition, games may be operated in a 360 VR environment, and game play situations of the games may be recorded and provided as 360 VR replay videos.

360 VR videos are manufactured as images to be displayed on a virtual spherical screen, and a user may control a display device in a desired direction to view an image displayed in that direction. That is, instead of watching the entire game replay video, the user views an image that is just in a direction the user wishes. Accordingly, when an advertisement is applied to a 360 VR game replay video, only advertisements displayed along a gaze of a user in a direction that the user is facing are exposed to the user, and other advertisements are not exposed to the user.

Whether advertisements applied to a 360 VR video are exposed to the user or not is not known until the user actually views the 360 VR video. Which advertisement is to be exposed to a user is determined based on a direction, in which the user views an image after controlling the 360 VR display device.

When data on advertisements that are actually exposed to a user while the user is viewing a 360 VR video, from among advertisements applied to the 360 VR video, is collected, various services may be provided based on the data. For example, based on the data, a service of charging advertising fees to advertisers only for advertisements that are actually exposed to the user may be provided.

Accordingly, a method of collecting data on whether an advertisement applied to a 360 VR game replay video is actually exposed to a user is required.

DESCRIPTION OF THE INVENTION

Provided is a method of collecting advertisement exposure data of a 360 virtual reality (VR) game replay video, in which data on whether an advertisement applied to the 360 VR game replay video is actually exposed to a user is collected.

According to an aspect of the present invention, there is provided a method of collecting advertisement exposure data of a 360 virtual reality (VR) game replay video, the method including: (a) storing, as game object information, shape data corresponding to each identification number of game objects that are to appear in a game replay video; (b) storing, as advertisement object information, shape data corresponding to each identification number of advertisement objects that are to appear in the game replay video; (c) storing, as game replay information, movement data of the game objects in virtual space over time during a game play; (d) storing, as advertisement application information, movement data of the advertisement objects to be applied to the game replay video in the virtual space over time; (e) generating a 360 VR replay video by incorporating the game object information, the advertisement object information, the game replay information, and the advertisement application information with one another and displaying the 360 VR replay video on a 360 VR display device; and (f) while (e) is performed, identifying identification numbers of advertisement objects exposed to the 360 VR display device from among advertisement objects, based on an angle between a gaze vector of a direction that the 360 VR display device faces and an advertisement vector of a direction of the advertisement objects displayed in the 360 VR replay video.

According to the method of collecting advertisement exposure data of a 360 VR game replay video of the present invention, data on advertisements that are actually exposed to a user when the user views the 360 VR game replay video by using the 360 VR display device, from among advertisements applied to the 360 VR game replay video, may be effectively collected.

DETAILED DESCRIPTION OF THE INVENTION

Hereinafter, a method of collecting advertisement exposure data of a 360 virtual reality (VR) game replay video according to the present invention will be described more fully with reference to the attached drawings.

Figure 1:
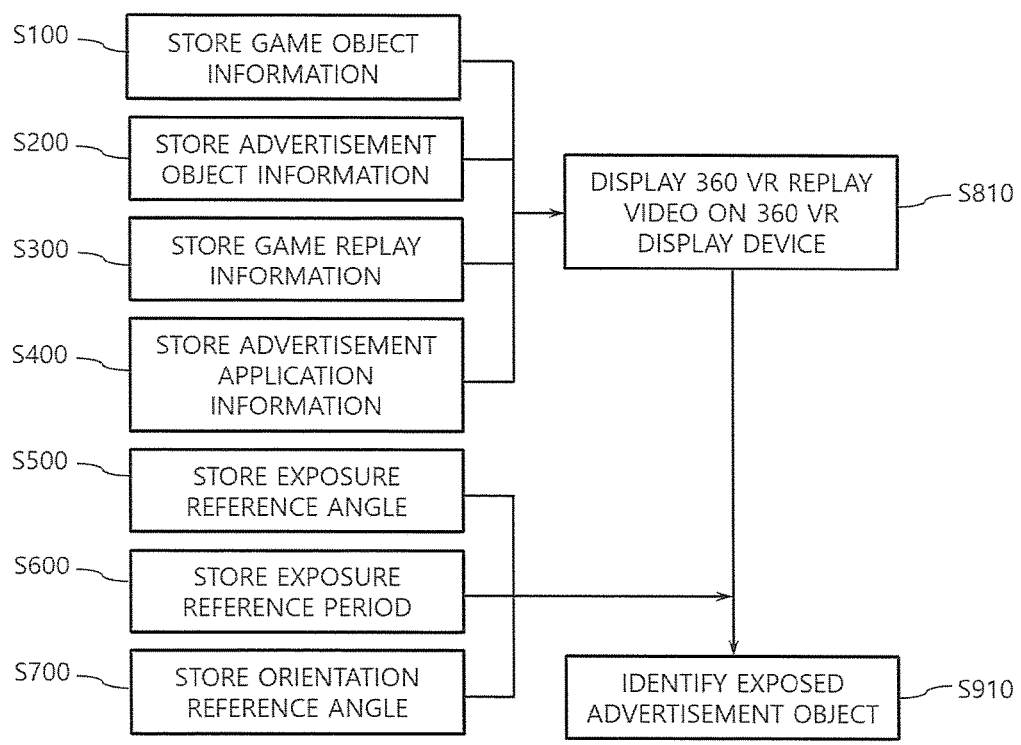
FIG. 1 is a flowchart of a method of collecting advertisement exposure data of a 360 virtual reality (VR) game replay video, according to a first embodiment of the present invention.

FIG. 1 is a flowchart of a method of collecting advertisement exposure data of a 360 VR game replay video, according to a first embodiment of the present invention.

The present invention relates to a method of identifying whether an advertisement applied to a game video is substantially exposed to a user and collecting data on the exposed advertisement when replaying the game video by using a 360 VR apparatus.

The present invention is used in games developed using, for example, Unity3D, which is used to develop a game by defining movement of objects such as things, characters and backgrounds. The present invention is applied when replaying a game play situation recorded by collecting game data, by using a 360 VR display device such as a head mounted display (HMD).

In order to replay a game video as described above, first, a 360 VR terminal including a 360 VR display device stores information needed to replay the game video.

First, the 360 VR terminal stores shape data corresponding to each identification number of game objects that are to appear in a game replay video in step (a) (S100). That is, information about various objects appearing in a game is stored. If the 360 VR terminal has played a game, game object information is also stored in the 360 VR terminal when the game is installed. If the 360 VR terminal receives game data to replay a game video, game object information is received via a network or the like to be stored.

Next, the 360 VR terminal stores shape data corresponding to each identification number of an advertisement object that is to appear in a game replay video, as advertisement object information, in step (b) (S200). The advertisement object information may also be installed when a game is installed so as to be stored in the 360 VR terminal, or the 360 VR terminal may access a designated server during a replay of the stored game video, to download and store the advertisement object information. Examples of advertisement objects may be a billboard to be displayed in virtual space, an ad balloon, and an image to be displayed on an outer surface of a game object in the form of a texture.

Next, the 360 VR terminal stores, as game replay information, movement data of game objects in a virtual space over time during a game play in step (c) (step S300). During a user's game play, data on positions, moving lines or the like of all objects existing in a virtual space, recorded as numerical data over time, correspond to game replay information. Instead of storing a game play situation as a conventional moving image file, which is a set of consecutive image frames, a game play situation is stored in the form of position information or shape information over time. By recording a game play situation as described above, a data capacity regarding replaying of a game video may be significantly reduced. The game replay information may be obtained by monitoring movements of game objects during the user's game play.

When the game replay information obtained as described above is uploaded to a video server, other users may access the video server and download and store just the game replay information in their 360 VR terminals.

Next, the 360 VR terminal stores movement data of the advertisement objects to be applied to a game replay video in a virtual space over time, as advertisement application information, in step (d) (S400). The advertisement application information is in a similar form as game replay information. The advertisement application information includes an order and forms in which advertisement objects are to be displayed on a game video when the user replays the game video based on game replay information. A game program may include a function of automatically generating advertisement application information. Alternatively, the video server as described above may generate advertisement application information to be applied to each piece of game replay information and provide the advertisement application information to be downloaded by a replay terminal.

The advertisement application information may be configured separately from the game replay information or may be included in the game replay information by editing the game replay information. For example, according to advertisement application information, some game objects appearing in a game video may be substituted with advertisement objects, or advertisement objects may be coated on an outer surface of game objects in the form of a texture. In addition, advertisement application information may be configured such that advertisement objects such as billboards or banners are inserted into a game replay virtual space. Advertisement objects applied according to advertisement application information may move, or the outer shape of the advertisement objects may change over time, or the advertisement objects may be fixed in a particular location to be displayed.

When the game replay information and the advertisement application information are stored in the replay terminal as described above, the 360 VR terminal may incorporate the game object information, the advertisement information, the game replay information, and the advertisement application with one another so as to generate a 360 VR replay video, and display the 360 VR replay video on the 360 VR display device in step (e) (S810).

Games played by a user may also be games in a format that is displayed on a typical mobile device or a display of a personal computer. A 360 VR terminal may also generate a replay image for this type of games based on game object information, advertisement object information, game replay information, and advertisement application information, and display the replay image on a 360 VR display device. As a 360 VR replay video is generated in real time by incorporating game data such as game object information and game replay information with advertisement object information and advertisement application, the 360 VR terminal may generate an optimum 360 VR video for various types of 360 VR display devices.

Figure 2:
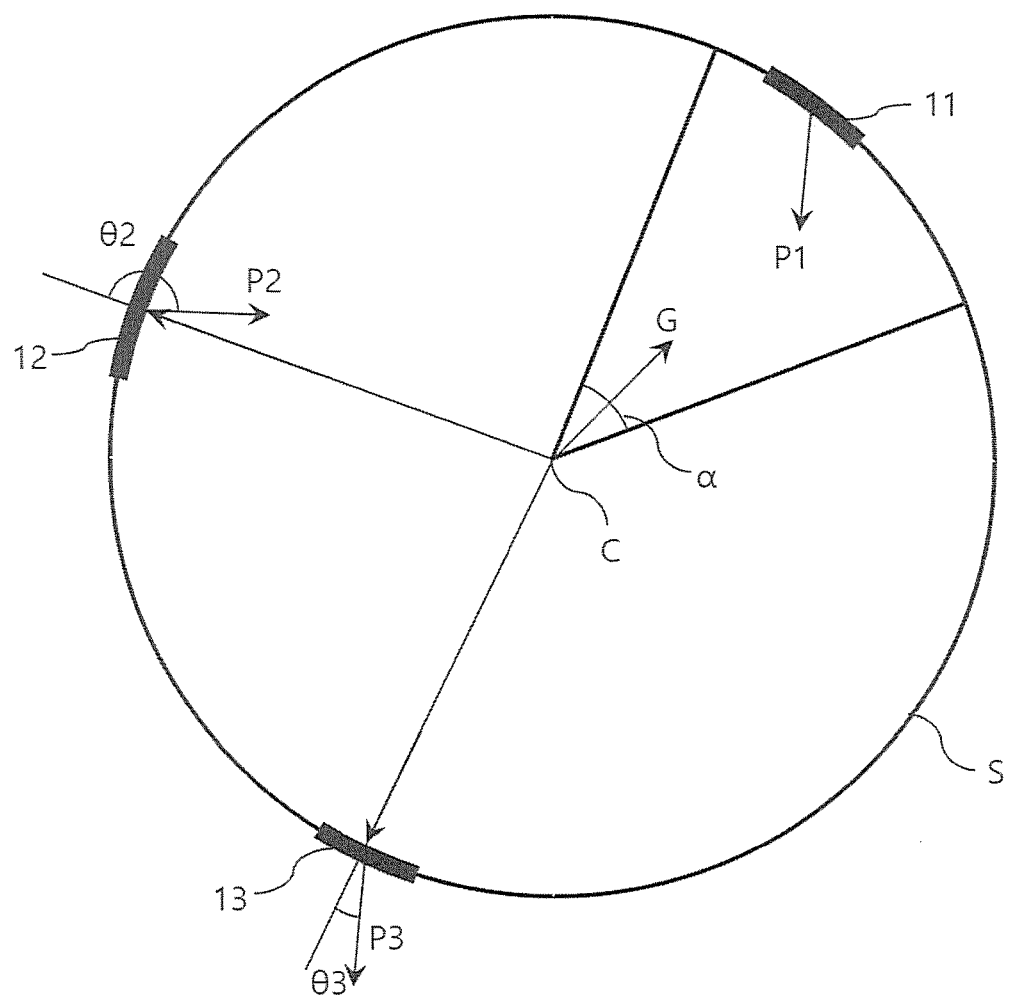
FIG. 2 is a conceptual diagram of a method of collecting advertisement exposure data of a 360 VR game replay video according to the present invention.

A 360 VR replay video is generated in a form that is displayable on a spherical virtual screen (S) as illustrated in FIG. 2. Due to characteristics of a 360 VR video, a user views only an image displayed on a partial area of the virtual spherical screen S by using a 360 VR display device such as a HMD. Accordingly, advertisement objects 12 and 13 displayed on the virtual spherical screen S except in an area viewed by the user are substantially not exposed to the user. According to the present invention, an advertisement object 11 that is actually visually exposed to the eyes of the user and the advertisement objects 12 and 13 that are not exposed to the eyes of the user are distinguished from among advertisements displayed in a virtual space based on advertisement object information and advertisement application information.

According to the present invention, advertisement objects that are actually exposed to a gaze of a user are sorted out based on an angle between the gaze of the user and the advertisement objects.

Referring to FIG. 2, a vector having a direction of the 360 VR display device is defined as a gaze vector G. That is, the gaze vector G is a direction vector in which the user faces a virtual spherical screen S by controlling the 360 VR display device. A direction in which the advertisement object 11 is displayed in a virtual space is defined as an advertisement vector P1. The advertisement vector P1 is a direction in which the advertisement object 11 is best viewed. In the case of a billboard or a banner, the advertisement vector P1 is a direction perpendicular to a plane on which an advertisement is displayed. An advertisement object having a spherical shape or a curved surface such as an ad balloon may have a plurality of advertisement vectors.

According to the present invention, if an angle between the gaze vector G and the advertisement vector P1 is within a set range of angle, it is determined that the advertisement object is exposed to the user visually. If the angle between the gaze vector G and the advertisement vector P1 is outside the range, it is determined that the advertisement object is not visually exposed to the user. For example, if the angle between the gaze vector G and the advertisement vector P1 is within a range from 120 degrees to 180 degrees, the 360 VR terminal determines that the advertisement of the advertisement object is exposed to the user.

To this end, the 360 VR terminal receives in advance an exposure reference angle used to determine whether the advertisement object 11 is exposed to the 360 VR display device and stores the exposure reference angle in step (g) (S500). The exposure reference angle may be input just once and stored in the 360 VR terminal, or depending on the characteristics of a 360 VR display device, the 360 VR terminal may store exposure reference angle values set by the user.

As described above, when an angle between the gaze vector G and the advertisement vector P1 is within a range of the exposure reference angle, a degree in which an advertisement object is visually exposed to the user may be distinguished effectively by measuring a period during which the advertisement object is maintained within the range of the exposure reference angle. For example, it may be determined that an advertisement object is exposed to a user only when the advertisement object is maintained in the range of the exposure reference angle for a longer period than a set period.

To this end, the 360 VR terminal may receive in advance an exposure reference period that may be used to determine whether an advertisement object is exposed to a 360 VR display device and store the exposure reference period in step (h) (S600). For example, if the exposure reference period is set to five seconds, the 360 VR terminal determines an advertisement object as being exposed to a user only when the advertisement object is maintained within a range of the exposure reference angle for five seconds or longer. The exposure reference period may be set in various manners by considering the type of games and the type of the 360 VR display devices, and may set to be varied according to replay situations.

Before sorting out advertisement objects based on the exposure reference angle and the exposure reference period as described above, advertisement objects that are actually difficult to be exposed to a user may be excluded in advance from objects to be identified, thereby effectively identifying whether an advertisement object is exposed or not.

For example, if the advertisement object 13 is oriented not inwardly toward the virtual spherical screen S illustrated in FIG. 2, the advertisement object 13 is not exposed to the user. By excluding the advertisement object 13 that is not inwardly oriented toward the virtual spherical screen S, the 360 VR terminal does not have to determine whether the advertisement object 13 is within the ranges of the exposure reference angle and the exposure reference period.

In order to exclude advertisement objects that are not inwardly oriented toward the virtual spherical screen S, angles between a direction extending from a center C of the virtual spherical screen S to the advertisement objects 11, 12, and 13 and advertisement vectors P1, P2, and P3 of the advertisement objects 11, 12, and 13 are defined as advertisement orientation angles θ2 and θ3. If the advertisement orientation angle θ2 is an obtuse angle, the advertisement objects 11 and 12 are inwardly exposed with respect to the virtual spherical screen S. If the advertisement orientation angle θ3 is an acute angle, the advertisement object 13 is outwardly exposed with respect to the virtual spherical screen S. For example, when the advertisement angles θ2 and θ3 are in a range from 120 degrees to 180 degrees, it may be determined that advertisement objects in this angle range are relatively highly likely to be exposed to the gaze of the user.

As described above, if a reference for the advertisement orientation angles θ2 and θ3 of advertisement objects, at which the advertisement objects may be exposed to a user, is preset, advertisement objects that are not to be exposed to the user may be excluded based on this reference.

That is, a reference angle range of the advertisement angles θ2 and θ3 with a possibility of exposure to the user (angles that are to be determined as being inwardly oriented with respect to the virtual spherical screen S) may be preset as an orientation reference angle, and the 360 VR terminal may exclude advertisement objects that are outside the reference angle range based on the orientation reference angle.

The 360 VR terminal receives in advance the orientation reference angle and stores the same in step (i) (S700). A process of storing the orientation reference angle may be performed only once and does not have to be performed later, but according to circumstances, the process may be performed again to adjust the orientation reference angle.

While the exposure reference angle, the exposure reference period, and the orientation reference angle are stored as described above, the 360 VR terminal performs step (e) described above to display a 360 VR game replay video on the 360 VR display device in step S810.

The user may control the 360 VR display device to view the 360 VR game replay video displayed in a direction that the user wishes.

Here, when a gaze direction of the user is set as the user has controlled the 360 VR display device, in step (f) (S910), the 360 VR terminal identifies identification numbers of advertisement objects exposed to the 360 VR display device based on an angle between the gaze vector G and the advertisement vector P1 with respect to the exposure reference angle that is previously stored in step (g).

That is, if the angle between the gaze vector G and the advertisement vector P1 is within a range of the exposure reference angle, the 360 VR terminal determines that an advertisement object corresponding to the above angle is exposed to the 360 VR display device to thereby identify an identification number of the advertisement object.

In addition, if a period during which the angle between the gaze vector G and the advertisement vector P1 is maintained within the range of the exposure reference angle is equal to or longer than the exposure reference period by applying the reference of the exposure reference period stored in step (h) (step S600), the 360 VR terminal determines that an advertisement object corresponding to the above angle is exposed to the 360 VR display device, thereby identifying an identification number of the advertisement object in step (f) (S910). By sorting out just identification numbers of objects maintained within the range of the exposure reference angle for the exposure reference period or longer, meaningful advertisement exposure data may be obtained. That is, advertisements that are of the user's interest may be tracked, and advertisements of the user's interest may be easily provided.

As the 360 VR terminal performs step (f) (S910) and stores data on periods of time during which the advertisement objects 11 identified as being exposed to the 360 VR display device are exposed to the 360 VR display device, the data may be used to effectively detect advertisements that are of the user's interest. In addition, this data may also be used to charge advertisement fees.

Meanwhile, accuracy of determining, by the 360 VR terminal, whether an advertisement is exposed or not may be further improved by identifying only when the advertisement orientation angles θ2 and θ3 of advertisement objects are within the range of the orientation reference angle based on the orientation reference angle stored in step (i) (S700), with respect to the exposure reference angle and the exposure reference period as described above. That is, the 360 VR terminal may exclude advertisement objects that have no or low possibility of being exposed to a user from among objects to be identified, and then examine only remaining objects as to whether they are exposed based on the exposure reference angle and the exposure reference period in step (f) (S910).

As described above, a result of identifying whether an advertisement is actually exposed to a user in a 360 VR replay video may be used for various purposes. For example, advertising fees may be charged in proportion to a period of time during which a corresponding advertisement object is actually exposed to a user. In addition, which advertisement objects are of the user's interest and viewed by the user for a relatively long period may be identified, and a target advertisement that suits the user's taste may be applied to a game replay video in real time based on data on the identified advertisement objects. Moreover, advertisement objects having a high advertising effect may be determined by accumulating meaningful advertisement exposure periods for each advertisement object, and an effective advertising strategy may be established based on data on the determined advertisement objects.

While the present invention according to the first embodiment is described above, the scope of the present invention is not limited to the above described and illustrated configuration.

Figure 3:
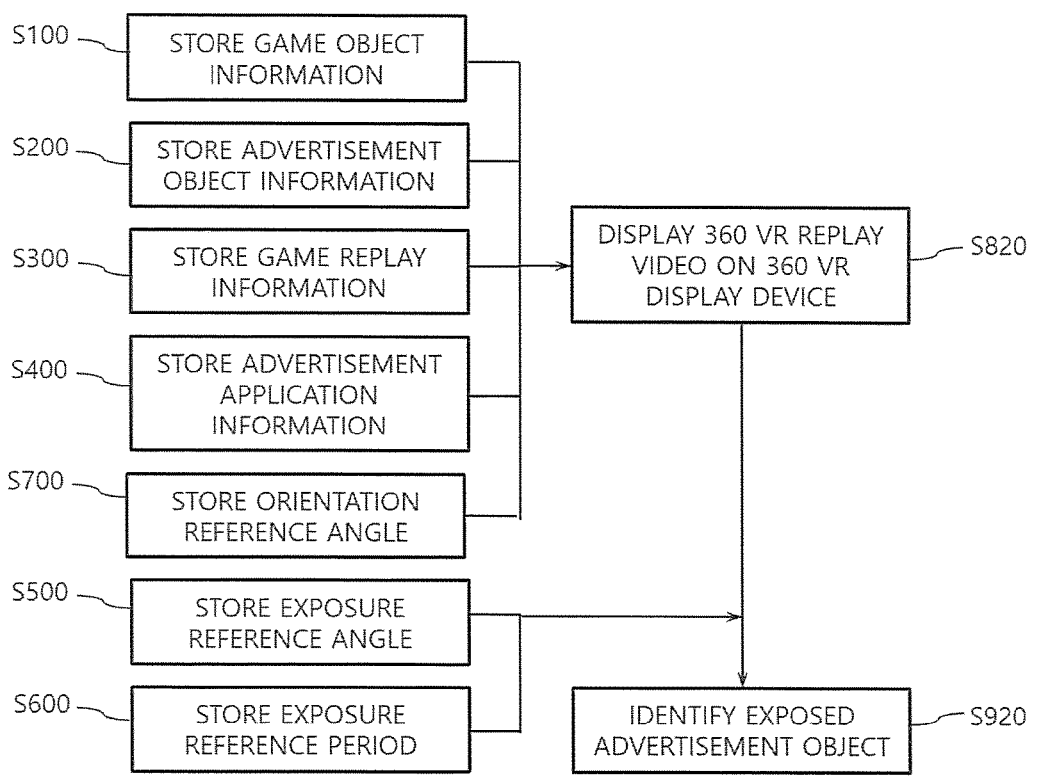
FIG. 3 is a flowchart of a method of collecting advertisement exposure data of a 360 VR game replay video, according to a second embodiment of the present invention.

FIG. 3 is a flowchart of a method of collecting advertisement exposure data of a 360 VR game replay video, according to a second embodiment of the present invention.

Steps (a) through (d) and (g) through (i) of the method according to the second embodiment of the present invention are respectively the same as those corresponding steps of the method of the first embodiment of the present invention. In FIG. 3, steps of the second embodiment that are the same as those of the first embodiment are labeled like reference numerals as in FIG. 1.

In the first embodiment described with reference to FIG. 1, the 360 VR terminal first displays all advertisement objects included in advertisement application information on the 360 VR display device in step (e) (S810), and then excludes those advertisement objects that are outside the range of the orientation reference angle to thereby identify exposed advertisements in step (f) (S910).

Differently from the first embodiment, in the second embodiment, the 360 VR terminal first excludes advertisement objects that are not to be exposed, based on an orientation reference angle, in step (e) (S820). That is, the 360 VR terminal performs step (e) (S820) such that a replay video is generated after excluding advertisement objects P3 that are outside a range of the orientation reference angle. In detail, the 360 VR terminal generates a game replay video by applying only advertisement objects having an exposure possibility after excluding in advance advertisement objects having a low exposure possibility in S820. In this case, in step (f) (S920), advertisements to be exposed are selected only based on an exposure reference angle and an exposure reference period.

Figure 4:
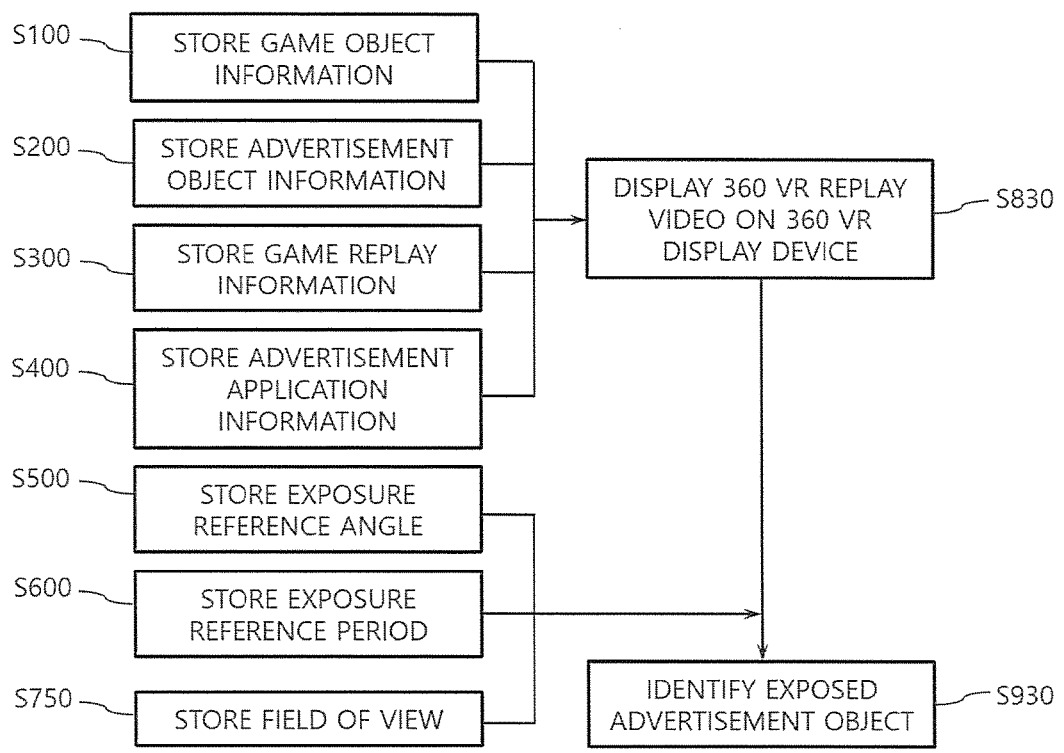
FIG. 4 is a flowchart of a method of collecting advertisement exposure data of a 360 VR game replay video, according to a third embodiment of the present invention.

FIG. 4 is a flowchart of a method of collecting advertisement exposure data of a 360 VR game replay video, according to a third embodiment of the present invention.

Referring to FIG. 4, according to the method of collecting advertisement exposure data of a 360 VR game replay video of the third embodiment of the present invention, instead of applying the concept of an orientation reference angle described above, a field of view (α) of a 360 VR display device is applied as a reference to exclude advertisement objects that are not to be exposed.

Steps (a) through (d) and (g) through (h) of the method according to the third embodiment of the present invention are respectively the same as those corresponding steps of the method of the first embodiment of the present invention. In FIG. 4, steps of the third embodiment that are the same as those of the first embodiment are labeled like reference numerals as in FIG. 1.

In step (e) (S830) of the method according to the third embodiment of the present invention, a 360 VR replay video is displayed on a 360 VR display device based on game object information, advertisement object information, game replay information, and advertisement application information as in the first embodiment.

According to the method of collecting advertisement exposure data of a 360 VR game replay video of the third embodiment of the present invention, instead of step (i) (S700) in which an orientation reference angle is stored, as in the first and second embodiments, step (k) (S750) of storing a field of view (α) is included. That is, the 360 VR terminal receives in advance a field of view (α) as a reference angle range that may be used to determine that an advertisement object is displayed on a 360 VR display device with respect to a gaze vector G, and stores the field of view (α) in step (k) (S750). The field of view (α) may be a fixed value depending on the type of the 360 VR display device or may be varied in real time according to user's manipulation. As the field of view (α) may not be known depending on the type of the 360 VR display device, an arbitrary overall value may be set as the field of view (α).

While the field of view (α) is selected and stored as described above, the 360 VR terminal may exclude the advertisement objects 12 and 13 that are outside a range of the field of view (α) with respect to the gaze vector G, which is in a gaze direction of the user, but may identify only with respect to the advertisement objects 11 existing in the range of the field of view (α), whether they are exposed to the user based on an exposure reference angle and an exposure reference period in step (f) (S930). According to the method, substantially meaningful advertisement object exposure data may be collected without applying an orientation reference angle described above as a reference.

While the preferred embodiments of the present invention have been described above, the present invention may also be carried out using other various methods.

In addition, advertisement exposure data may also be collected by applying a combination of the above-described methods. That is, the concepts of an orientation reference angle and a field of view may be both applied to exclude objects having a low exposure possibility with respect to the user.

While this invention has been particularly shown and described with reference to various embodiments thereof, the present invention should not be construed as being limited to the embodiments set forth herein; various changes, combinations, and modifications may be made therein without departing from the spirit and scope of the present invention as defined by the appended claims.

What is claimed is:

1. A method of collecting advertisement exposure data of a 360 virtual reality (VR) game replay video displayed on a virtual spherical screen of a 360 degree VR head mount display, the method comprising:
   (a) storing, as game object information, shape data corresponding to each identification number of game objects in a game video by the 360 degree VR head mount display;
   (b) storing, as advertisement object information, shape data corresponding to each identification number of advertisement objects in the game video by the 360 degree VR head mount display;
   (c) storing, as game replay information, movement data of the game objects in virtual space over time during a game play by the 360 degree VR head mount display;
   (d) storing, as advertisement application information, movement data of the advertisement objects to be applied to the 360 VR game replay video in the virtual space over time by the 360 degree VR head mount display;
   (e) generating the 360 VR game replay video by incorporating the game object information, the advertisement object information, the game replay information, and the advertisement application information with one another and displaying the 360 VR game replay video on a 360 VR display device by the 360 degree VR head mount display; and
   (f) while (e) is performed, identifying and tracking the identification number of a first advertisement object, among the advertisement objects, exposed to a gaze vector of a direction that the 360 degree VR head mount display faces, when determined that an angle between the gaze vector and an advertisement vector of a direction of the first advertisement object to be displayed in a VR space of the 360 VR game replay video is within a predetermined range by the 360 degree VR head mount display.

2. The method of claim 1, wherein in (f), storing a period during which the first advertisement object identified as being exposed to the 360 VR head mount display.

3. The method of claim 1, further comprising (g) storing an exposure reference angle that is used as a reference for determining whether the first advertisement object is exposed to the 360 VR head mount display in (f),
   wherein in (f), if the angle between the gaze vector and the advertisement vector of the first advertisement object is within the predetermined range defined by the exposure reference angle, it is determined that the first advertisement object corresponding to the advertisement vector forming the angle with the gaze vector is exposed to the 360 VR head mount display so as to identify the identification number of the first advertisement object.

4. The method of claim 3, further comprising (h) storing an exposure reference period that is used as a reference for determining whether the first advertisement object is exposed to the 360 VR head mount display in (f),
   wherein in (f), if the angle between the gaze vector and the advertisement vector of the first advertisement object is maintained for the exposure reference period or longer, it is determined that the first advertisement object is exposed to the 360 VR head mount display so as to identify the identification number of the first advertisement object.

5. The method of claim 1, wherein in (f), only the identification number of the first advertisement object having an advertisement orientation angle within a preset angle range is identified based on the angle between the gaze vector and the first advertisement vector among the advertisement objects included in the advertisement application information,
   wherein the advertisement orientation angle is an angle between an object direction of the advertisement objects and a direction extending from a center of the virtual spherical screen to the advertisement object.

6. The method of claim 5, further comprising storing an orientation reference angle that is used as a reference for determining that the first advertisement object is inwardly oriented toward the virtual spherical screen based on the advertisement orientation angle,
   wherein in (f), whether the first advertisement object is exposed to the 360 VR head mount display is determined only when an advertisement orientation angle of the first advertisement object is within a range of the orientation reference angle.

7. The method of claim 1, wherein in (e), the 360 VR game replay video is generated by excluding a second advertisement object having an advertisement orientation angle that is outside a preset angle range, among advertisement objects included in the advertisement application information, wherein the advertisement orientation angle is an angle between an object direction of the advertisement objects and a direction extending from a center of the virtual spherical screen to the advertisement objects.

8. The method of claim 7, further comprising storing an orientation reference angle that is used as a reference for determining the first advertisement object as being inwardly oriented toward the virtual spherical screen based on the advertisement orientation angle,
   wherein in (e), the 360 VR game replay video is generated by excluding the second advertisement object having the advertisement orientation angle that is outside a range of the orientation reference angle among the advertisement objects.

9. The method of claim 1, wherein in (f), whether the first advertisement object is exposed to the 360 VR head mount display is identified only when the first advertisement object is in a preset angle range with respect to the gaze vector.

10. The method of claim 9, further comprising storing a range of angle (field of view) that is used as a reference for determining that the first advertisement object is displayed on the 360 VR head mount display with respect to the gaze vector,
    wherein in (f), whether first advertisement object is exposed to the 360 VR head mount display is identified only when the first advertisement object is in the range of the field of view with respect to the gaze vector.

* * * * *